US009038171B2

(12) United States Patent
Jeremiah

(10) Patent No.: US 9,038,171 B2
(45) Date of Patent: May 19, 2015

(54) VISUAL DISPLAY OF WEBSITE TRUSTWORTHINESS TO A USER

(75) Inventor: Garreth Jeremiah, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1830 days.

(21) Appl. No.: 12/254,235

(22) Filed: Oct. 20, 2008

(65) Prior Publication Data

US 2010/0100958 A1  Apr. 22, 2010

(51) Int. Cl.
G06F 21/00 (2013.01)
H04L 29/06 (2006.01)
G06F 21/36 (2013.01)
G06F 21/57 (2013.01)
H04L 29/08 (2006.01)

(52) U.S. Cl.
CPC .............. *H04L 63/101* (2013.01); *G06F 21/36* (2013.01); *G06F 21/57* (2013.01); *G06F 2221/2119* (2013.01); *H04L 67/36* (2013.01); *H04L 67/306* (2013.01); *H04L 67/02* (2013.01)

(58) Field of Classification Search
USPC ..................................................... 726/22–24
See application file for complete search history.

(56) References Cited

U.S. PATENT DOCUMENTS 7,200,576 B2    4/2007  Steeves et al.
8,015,606 B1 *  9/2011  Jevans et al. ..................... 726/22
2005/0060581 A1 *  3/2005  Chebolu et al. ................ 713/201
2006/0080735 A1    4/2006  Brinson et al.
2007/0074125 A1 *  3/2007  Platt et al. ...................... 715/760
2007/0094500 A1    4/2007  Shannon et al.
2007/0245422 A1   10/2007  Hwang et al.
2009/0006861 A1 *  1/2009  Bemmel ........................ 713/189

FOREIGN PATENT DOCUMENTS

WO    2007/007988 A2    1/2007
WO    2007/106826 A2    9/2007

OTHER PUBLICATIONS

Agarwal et al., "Phishing Forbidden", QUEUE Focus Web Development, vol. 5, Issue 5, pp. 28-32 (2007).
Youll, J., "Fraud Vulnerabilities in SiteKey Security at Bank of America", Challenge/Response LLC, pp. 1-15 (Jul. 18, 2006).
Perez, J.C., "Microsoft Adds Antiphishing to IE Toolbar", PC World, IDG News Service, (Aug. 31, 2005), (http://www.pcworld.com/article/id,122378-page,1/article.html).

(Continued)

*Primary Examiner* — Ghazal Shehni
(74) *Attorney, Agent, or Firm* — Ronald A. Kaschak; Kevin P Radigan, Esq.; Heslin Rothenberg Farley & Mesiti P.C.

(57) ABSTRACT

Website trustworthiness is automatically displayed to a user by pre-establishing a user-defined good list identifying one or more known good website addresses. Each known good website address in the user-defined good list has associated therewith at least one user-defined visual characteristics for display. Subsequently, responsive to the user selecting to visit a website address identified in the user-defined good list, the website is displayed for the user and the user-defined visual characteristics associated therewith from the user-defined good list are also concurrently displayed with the website. The user-defined visual characteristics provide the user with a visual indication of website trustworthiness concurrently with display of the website.

20 Claims, 13 Drawing Sheets

(56) References Cited

OTHER PUBLICATIONS

Tally et al., "Anti-Phishing: Best Practices for Institutions and Consumers", McAfee Research, McAffe, Inc., Technical Report #4-004 (Sep. 2004).

Florencio et al., "Analysis and Improvement of Anti-Phishing Schemes", Security and Privacy in Dynamic Environments, vol. 201, pp. 148-157 (Boston: Springer) (Jan. 2006).

* cited by examiner

| USER DEFINED "GOOD" LIST (UDGL) | | | | |
|---|---|---|---|---|
| NAME | URL | CATEGORY | CUSTOM TEXT | GRAPHIC | COLOR (RGB) |
| | | | | | GREEN & BLUE |
| | | | | | GREN & BLUE |

| PREDEFINED "GOOD" LIST (PGL) | | |
|---|---|---|
| NAME | URL | CATEGORY |
| | | |
| | | |

| USER DEFINED "BAD" LIST (UDBL) | | | | |
|---|---|---|---|---|
| NAME | URL | CATEGORY | CUSTOM TEXT | GRAPHIC | COLOR (RGB) |
| | | | | | RED |
| | | | | | RED |

| PREDEFINED "BAD" LIST (PBL) | | |
|---|---|---|
| NAME | URL | CATEGORY |
| | | |
| | | |

| VALIDATION LIST (VL) |
|---|
| UDGL (MANDATORY) |
| UDBL (OPTIONAL) |
| PBL (OPTIONAL) |

540

} DOES NOT CONTAIN PGL

FIG. 5E

VISUAL DISPLAY OF WEBSITE TRUSTWORTHINESS TO A USER

TECHNICAL FIELD

The present invention relates in general to facilitating trustworthy communication across a network, and more particularly, to an anti-phishing technique employing visual display to a user of a website's trustworthiness.

BACKGROUND OF THE INVENTION

The proliferation of computers and the maturing of the Internet have resulted in the Internet increasingly becoming a medium used to conduct online commerce involving the exchange of information, including personal information. For example, many consumers regularly engage in online banking or other online activities. Such activities often require the user to provide personal information, such as an account number, password, credit card number, etc.

The exchange of personal information over the Internet has also resulted in the propagation of a large number of "phishing" schemes that attempt to obtain a user's personal information through deceptive electronic communications. Phishing often involves the providing of a sham e-mail message or website (i.e., website page) to a user. For example, an e-mail message containing an HTML input form may be provided to a user, seeking to fool the user into submitting personal, financial, and/or password data. Other phishing techniques may involve displaying to the user a sham website page that replicates features of another, legitimate website page. The sham page may request personal information from the user, leading the user to believe that the user is providing information to a legitimate entity, when in reality, the user is providing the information to a phishing entity.

SUMMARY OF THE INVENTION

Therefore, presented herein are a method, system and article of manufacture for displaying visual confidence to a user of a website's trustworthiness concurrent with display of the selected website page to the user.

In one aspect, the shortcomings of the prior art are overcome and additional advantages are provided through the provision of a method of displaying website trustworthiness to a user. The method includes: establishing a user-defined good list identifying at least one known good website address, each known good website address in the user-defined good list having associated therewith at least one user-defined visual characteristic for display; and responsive to the user selecting to visit a website address identified in the user-defined good list, displaying the website for the user and concurrently displaying the at least one user-defined visual characteristic associated therewith from the user-defined good list, wherein the at least one user-defined visual characteristic provides a customized visual indication of website trustworthiness for the user.

Systems and articles of manufactures relating to one or more aspects of the present invention are also described and claimed herein. Further, services relating to one or more aspects of the present invention are also described and claimed herein.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5A depicts one embodiment of a user-defined good list (UDGL) to be employed in establishing a validation list for facilitating providing a visual indication of website trustworthiness to a user, in accordance with an aspect of the present invention;

FIG. 5B depicts one embodiment of a predefined good list (PGL) employed in one embodiment of logic for establishing the user-defined good list of FIG. 5A, in accordance with an aspect of the present invention;

FIG. 5C depicts one embodiment of a user-defined bad list (UDBL) to be optionally employed in establishing a validation list for facilitating providing a visual indication of website trustworthiness (i.e., untrustworthiness in this case) to a user, in accordance with an aspect of the present invention;

FIG. 5D depicts one embodiment of a predefined bad list (PBL) to be optionally employed in establishing a validation list for facilitating providing a visual indication of website trustworthiness for the user, in accordance with an aspect of the present invention;

FIG. 5E depicts one embodiment of a validation list (VL) comprising the user-defined good list, and optionally comprising the user-defined bad list and/or the predefined bad list for facilitating providing a visual indication of website trustworthiness for a user, in accordance with an aspect of the present invention;

DETAILED DESCRIPTION OF THE INVENTION

As briefly noted above, phishing schemes attempt to cajole an unwitting user into entering personal and/or financial information (or information that can lead to the leakage or unwanted access to such information) for use by an attacker. The attacker commonly creates a website that mimics the website of, for example, a financial institution such as a bank. A user, believing that they are interacting with the bank's website, enters their personal information (e.g., login and password information, etc.) to the fake "look alike" website created by the attacker, thereby allowing the attacker to obtain the credentials of the user for the purposes of impersonation. The attacker has thus exploited the user's inability to distinguish between the real website and the attacker's fake website.

Various solutions to this phishing problem attempt to validate the user-selected website against a list of known bad sites. Such lists are only useful after a phishing attempt has been reported, and the phishing website has been added to the list. Moreover, these attempts would typically be failed attempts, and there may have already been successful phishing attempts prior to the site becoming listed as a bad website. Additionally, all sites would need to be checked against such a registry.

Another solution is to employ a "domain salted password store" that automatically provides the password to a website based on a hash of the domain of the website being visited. Since the phishing site does not have the same hash as the valid website, the password would not be retrieved. This would still not prevent, however, the user from manually disclosing their own password(s). In addition, all of the users' passwords are archived in a single location, making this tool a prime target for attack.

Detection of the methods used for performing a phishing attack is another possible solution. This approach is to detect, for example, web pages that create layers to the screen that obfuscate the real website address (i.e., URL) that the user is going to, or detect IP addressing in the URL, etc. These methods have been shown to be subject to bypassing via obfuscation and evasion techniques.

A persistent desktop cookie is another option that requires the user to perform some additional authentication when the desktop cookie doesn't exist. This method can become an annoyance to users if they forget their additional authentication information. Also, additional phishing schemes can often result in this information being given up.

A major drawback to the above-outlined techniques is that the target of the attack, i.e., the user, is often not technically savvy. Requiring the user to amend their typical browsing behavior or to "give over control" to an application, is often undesirable. Commonly, therefore, the goal in existing anti-phishing approaches is to identify the website as a known bad website address.

Figure 1:
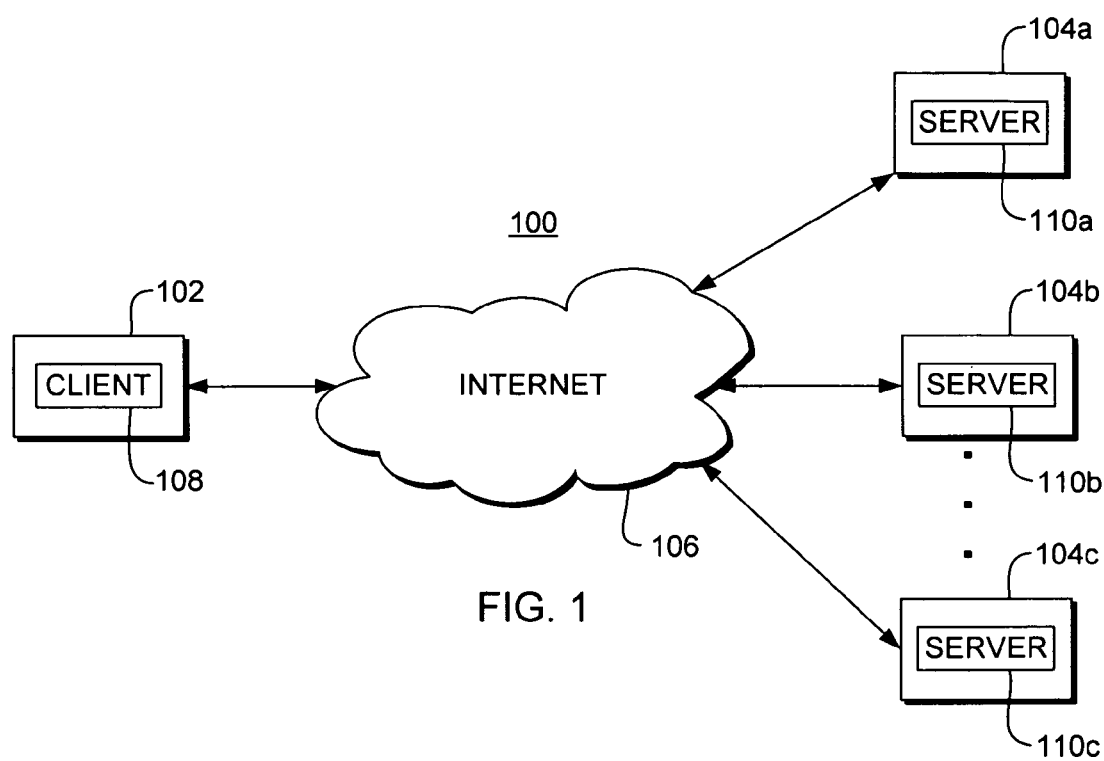
FIG. 1 depicts one example of a processing environment incorporating and using one or more aspects of the present invention.

In contrast, provided herein is a technique for visually displaying website trustworthiness to a user based on a user's own list of user-defined, known good websites. Such a user-defined good list of website addresses may be created and used in a number of processing environments, including, but not limited to, client/server environments. One example of a client/server environment incorporating or using one or more aspects of the present invention is depicted in FIG. 1. As shown, a client/server environment 100 includes, for example, a processing unit 102 coupled to one or more processing units 104a, 104b, 104c via an Internet connection 106. Processing unit 102 includes a client application 108 (a/k/a, a client) and processing units 104a, 104b & 104c each include a server application 110a, 110b, 110c (a/k/a, a server), respectively. Each processing unit 102, 104a, 104b & 104c includes, for instance, a personal computer, a laptop, a workstation, a mainframe, a mini-computer, or any other type of processing unit or device that connects to the Internet. As an example, any commercially available processing unit may be used. Processing unit 102 may or may not be the same type of unit as processing units 104a, 104b & 104c and processing units 104a, 104b & 104c may be the same or different types of processing units. In this example, the processing units are coupled via the Internet. However, in other examples, they may be coupled by other types of connections, including, but not limited to, wire connections or any type of network connections, such as a local area network (LAN), a wide area network (WAN), a token ring, an Ethernet connection, etc.

Although the example described herein includes a client/server environment coupled by the Internet, in other examples, other environments may include one or more aspects of the present invention. For example, one or more of the connections may be other than across the Internet.

Figure 2A:
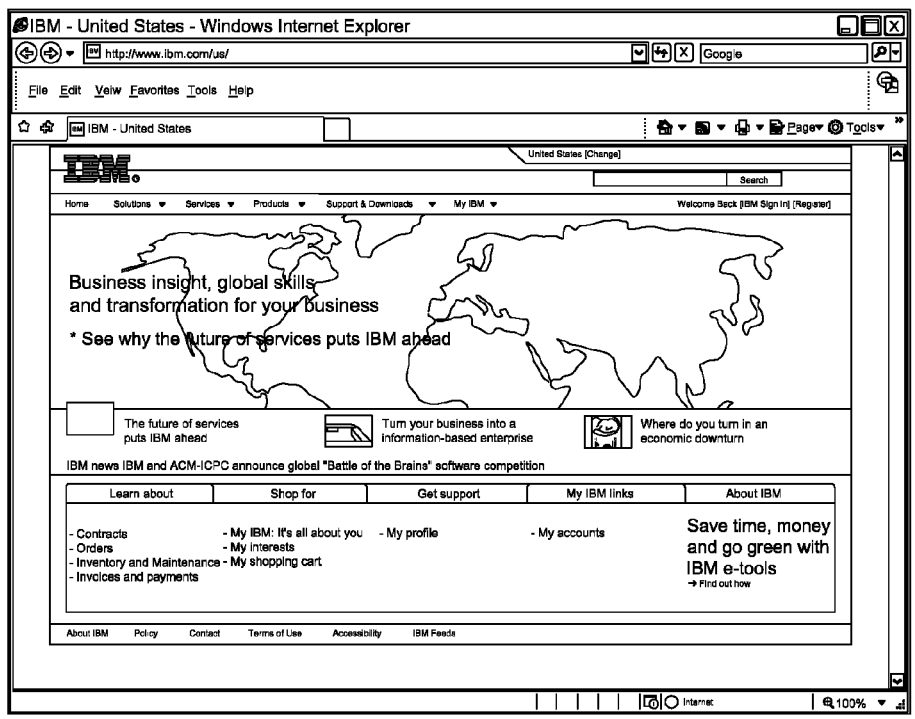
FIG. 2A is a display of a website page for which trustworthiness is to be provided, in accordance with an aspect of the present invention.

In the example described herein, a client requests access to a website hosted by, for example, processing unit 104a. In many phishing schemes, an attacker seeks to replicate the look and feel of an authentic website (e.g., website page) in order to phish information from the user. In accordance with an aspect of the present invention, therefore, the user customizes the look and feel of the display of the desired website in a manner which cannot be anticipated by an attacker. FIG. 2A depicts a display presenting a valid user-selected website page addressed by a user. In accordance with an aspect of the present invention, a border or frame, along with user-defined text or user-defined graphic, is concurrently displayed within the display as one or more user-defined visual characteristics which provide a customized visual indication of the website's trustworthiness to the user.

Figure 2B:
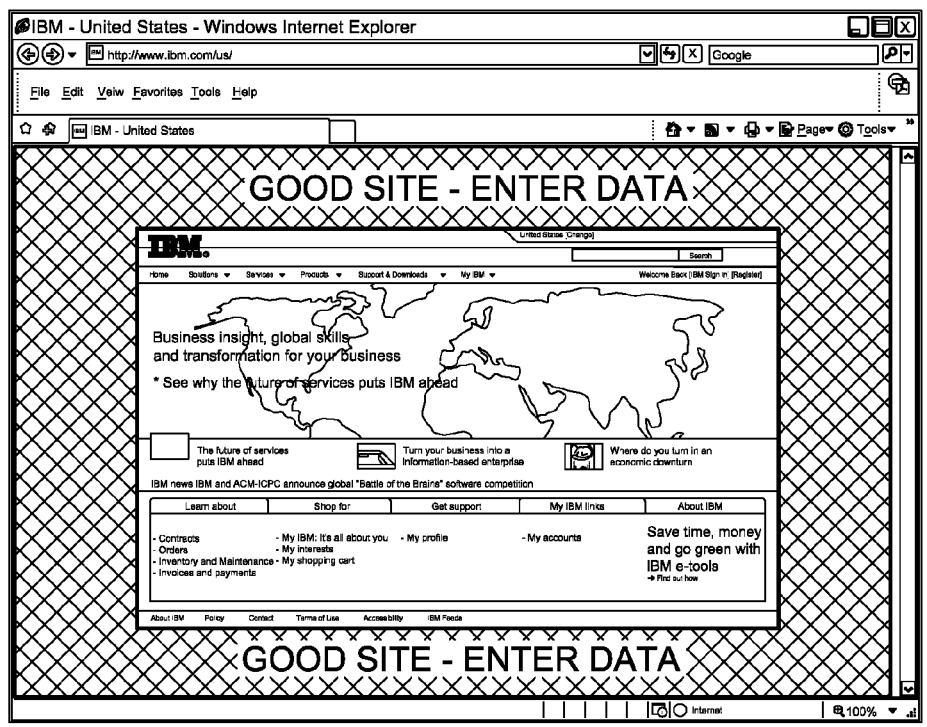
FIG. 2B is a depiction of the website page of FIG. 2A, with a colored border and custom user-defined text concurrently displayed therewith to provide a visual indication of the website's trustworthiness to the user, in accordance with an aspect of the present invention.

In FIG. 2B, a border or frame is concurrently displayed along with the user-selected website. In this example, the user-selected website comprises a known good website address that is in a user-defined good list (UDGL) 500 (see FIG. 5A). As explained further below, the user-defined good list identifies known good website addresses accessed by the user and associated with each are one or more user-defined visual characteristics for display concurrently with display of the associated known good website. Thus, in this example, the user has customized the border or frame with the color green, and added a user-defined text "Good Site—Enter Data" text message within the border region of the display. Note that the frame or border may be created by different processes. In bordering, a bordering process will, given a website address (i.e., URL), create a border using a color defined in the user-defined good list and additionally display any user-defined text or graphic set forth in the user-defined good list. The method of displaying the border can vary between HTML framing approaches. In one embodiment, framing may be implemented by a proxyed site.

In proxy mode, a user's browser is configured to send communications via a network proxy on the local host (or alternatively, on a network host). The system described herein can be implemented as that proxy. When a connection is made to a website, the system receives the data directly from the user's browser. The system makes the request on behalf of the user, and in the event that the website address matches a website address in the user-defined good list, then the bordering process is initiated. Otherwise, the proxy returns the requested web page unaltered. In framing a proxyed site, the desired website address is placed inside of a frame set, internal frame or page layer, in order to display the requested page inside the system border or frame (as illustrated in FIG. 2B). Several web pages use techniques to "break out" of frames (e.g., by detecting that they are not at the top level of the DOM). This is implemented at the client side, typically using JavaScript or HTML target "_TOP" tags. Because the above-described system is employing (in one embodiment) a proxying technique, it would have the ability to remove such "break out" code. Alternatively, where this is not practical or undesirable, an overlay bordering technique can be employed.

Figure 2C:
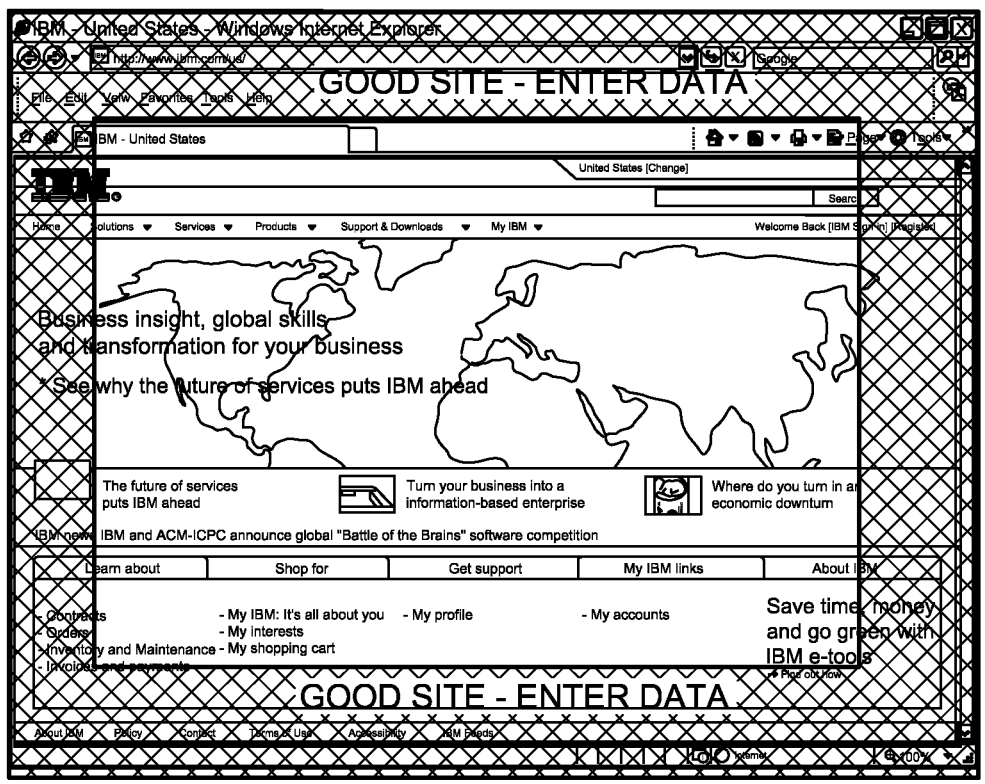
FIG. 2C is an alternate embodiment of a colored border overlay and custom user-defined text concurrently displayed over the website page of FIG. 2A to provide a visual indication of the website's trustworthiness to the user, in accordance with an aspect of the present invention.

FIG. 2C illustrates one embodiment of a border overlay on top of a user-selected website page. In overlaying, instead of interacting through the web content, the bordering process can interact directly with the user's screen (i.e., display). A colored, alpha-blended "halo" can be placed around the edge of the screen several pixels in width to make it obvious to the user when the desired application has focus (i.e., the web browser displays a website address that matches a known good website address in the user-defined good list). This overlay is not part of the web page, or the web browser, but merely provides a customized visual indication of website trustworthiness to the user. Width of the border, frame or overlay can vary depending upon the implementation.

Figure 3A:
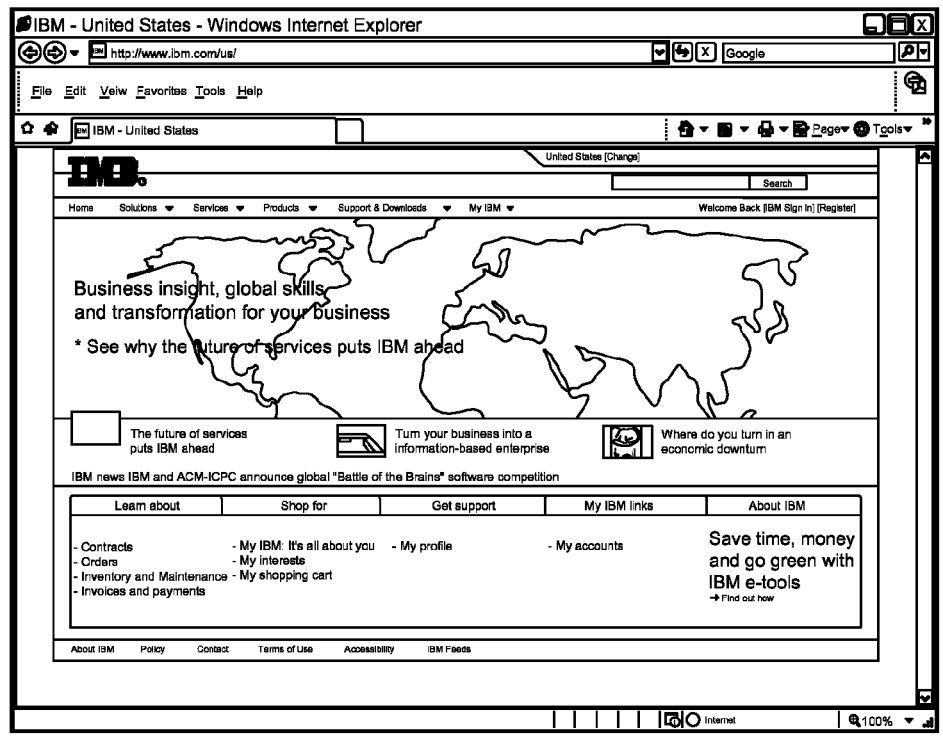
FIG. 3A is a display of a bad or phishing website page for which a visual indication of trustworthiness (or untrustworthiness) is to be provided, in accordance with an aspect of the present invention.
Figure 3B:
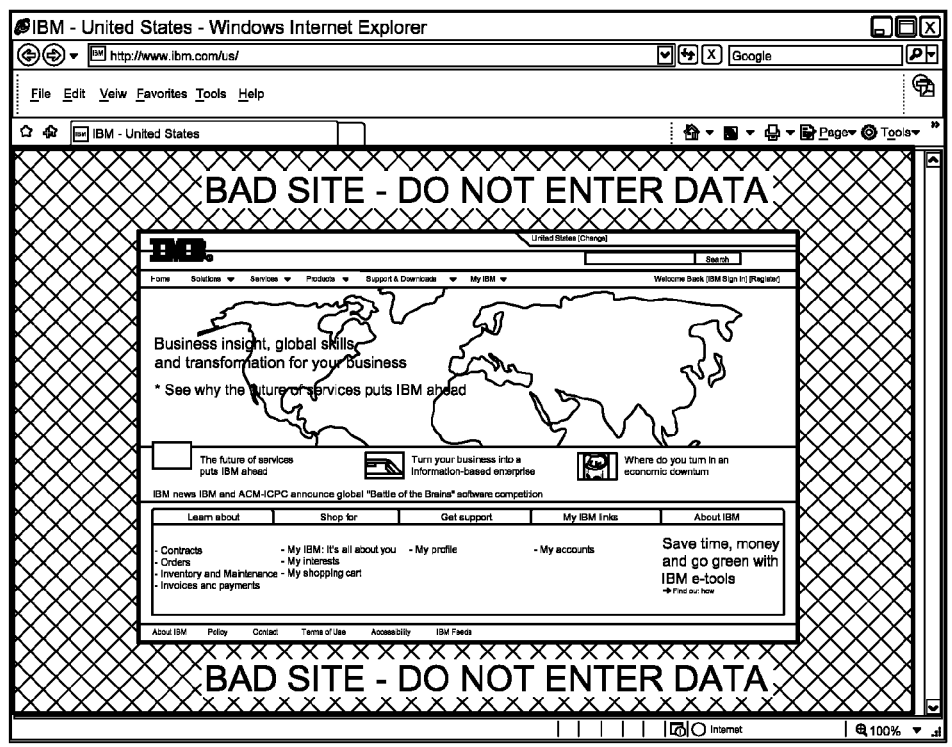
FIG. 3B depicts the website page of FIG. 3A, with a colored boarder and custom user-defined text concurrently displayed therewith to provide a visual indication of the website's trustworthiness (i.e., untrustworthiness in this case) to the user, in accordance with an aspect of the present invention.

In FIG. 3A, an attacker has substantially replicated the look and feel of a website to phish information from a user. This bad website page is to be identified and visually highlighted to the user through, for example, a default visual indication of the website's trustworthiness, or a customized visual indication of the website's trustworthiness. In FIG. 3B, a user-defined bad list (UDBL) 520 (FIG. 5C) is employed as described further below in providing the customized visual indication of website trustworthiness (which in this case illustrates a lack of trust). Assuming that the website address is identified in the user-defined bad list, then one or more user-defined visual characteristics associated therewith in the user-defined bad list are concurrently displayed along with the website. As explained above, these visual characteristics may include color of a border or frame region, as well as a user-defined text or a user-defined graphic, for example, superimposed within the border or frame region. In one example, the customized visual indications for an untrusted website would include a red border, along with any user-defined custom text or graphic.

Figure 4:
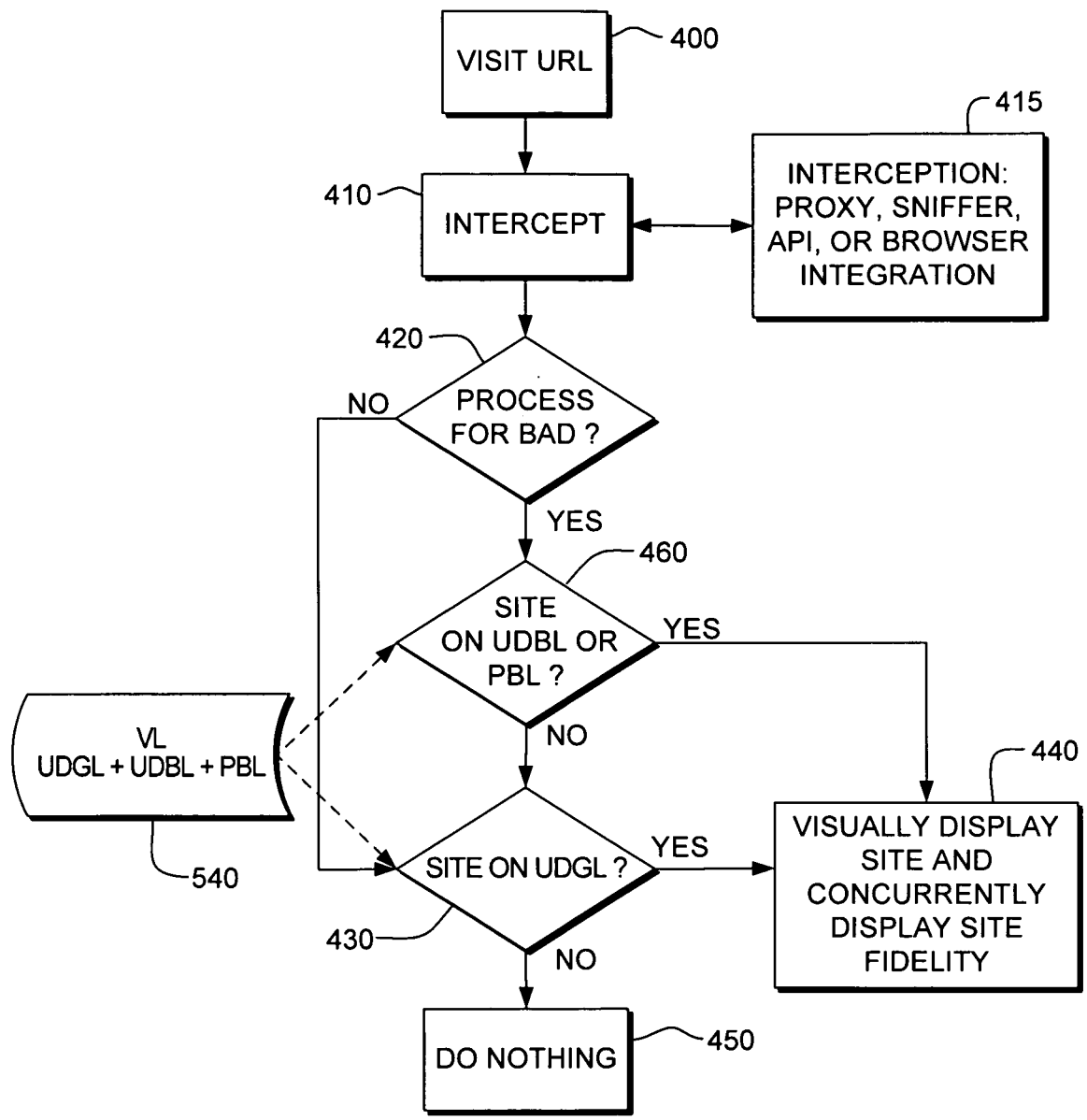
FIG. 4 depicts one embodiment of logic for intercepting and analyzing a user-selected website address to determine whether a visual indication of website trustworthiness is to be provided to the user, in accordance with an aspect of the present invention.

FIG. 4 illustrates one embodiment of logic for intercepting and analyzing a user-selected website address to determine whether a visual indication of website trustworthiness is to be provided to the user with display of the website. Initially, a user selects a website address (i.e., URL) to be visited, STEP 400. This user-selection of a website address is intercepted, STEP 410, using any one of a number of available approaches, including proxy, sniffer, API or browser integration interception, BLOCK 415. Briefly described, proxy interception employs a proxy mode wherein a user browser is configured to send traffic via a network proxy on the local host, or on a network host. Thus, when connection is made to a website address, the proxy system receives the data directly from the user's browser and the system makes the request on behalf of the user. In the event that a user-selected website address matches a known good website address in the user-defined good list (UDGL) 500 (FIG. 5A), then the associated user-defined visual characteristic(s) is identified and employed in concurrently providing the customized visual indication of website trustworthiness to the user.

In a sniffer interception approach, a non-promiscuous sniffer can, without administrative permission, "see" traffic from the local system. This type of sniffer is used to sample HTTP communications, that is, examine the headers in the HTTP request of an HTTP 1.1 communication. The "host" header will contain the requested domain, and the "GET" or "POST" portion of the header indicates the path component. This allows a complete website address to be constructed (if desired), though the host portion may be sufficient. If there is an address match on any of the user-defined lists (described below), then the customized visual indication process is initiated to provide the website trustworthiness to the user. Otherwise, no action is taken and the website page is displayed unaltered.

In application program interrogation, interrogation of the application and user interface components is performed to obtain fields used to enter a website address from a web browser application. It is also possible, by interrogating the windowing system, to determine when a particular document or page is in the foreground. Using these two techniques, it can be determined when a web browser is displaying a web page in the foreground and also obtain the website address for that page. If the website address matches a website address in one or more of the below-described lists, then the customized visual indication processing can be initiated. Otherwise, no action is taken.

FIG. 5A illustrates one embodiment of the user-defined good list (UDGL) 500, wherein each item in the list includes a known good website address (i.e., URL), and a name for that website address, along with an optional categorization of the website address (e.g., bank). In accordance with the present invention, the user selects a color from the green and blue components of an RGB display (e.g., within a pixel intensity range of a non-zero lower limit to 255 as the upper limit for the green or blue color components of the RGB display), and provides a user-defined text message or a user-defined graphic, either or both of which may be displayed within the frame or border region being concurrently displayed with the display of the requested website page. As explained further below, creation of the UDGL may employ a predefined good list (PGL) 510 (FIG. 5B), which may be provided to or accessible by a user when constructing the user-defined good list, as described below. The PGL also includes the URL (i.e., website address) and an associated name and/or category for each known good website in the list. The UDGL 500 (FIG. 5A) is distinct from the PGL 510 (FIG. 5B), in that the UDGL 500 (FIG. 5A) is user-created, while the PGL 510 (FIG. 5B) is assumed to be pre-existing or created by a third party separate from the user. In one embodiment, the PGL may be an extensive list of most known good website addresses where credentials are exchanged to provide access to sensitive information (e.g., banking, insurance, medical, shopping, etc.). The URL would typically not be the root URL for that site, but the web page that exchanges credentials, that is, the "login" page.

If desired, a user-defined bad list (UDBL) 520 (FIG. 5C) may also be created and employed in processing a user-selected website address to determine the type of visual indication of website trustworthiness is to be provided to the user. The UDBL 520 is a listing of each user-known bad website address (i.e., URL), along with a name for that website address, and a subject category of the website. Further, the UDBL 520 contains a user-defined visual characteristic(s) for display in association with each known bad website address in the UDBL. These user-defined visual characteristics may be the same or different characteristics for each known bad website address in the UDBL. For example, the color red (e.g., within a pixel intensity range of a non-zero lower limit to 255 as the upper limit for the red color component of the RGB display) may by default be employed in the border or frame concurrently displayed along with the bad website page, as well as a user-defined text message or a user-defined graphic image, both of which may also appear within the border region, as illustrated in FIG. 3B. As used herein, a user-defined graphic could comprise any customer-selected graphic which may be, for example, tiled into the border region being concurrently displayed with the website page.

In FIG. 5D, a predefined bad list (PBL) 530 is illustrated. This predefined bad list is an existing list of most known bad website addresses which, in one embodiment, is accessed by or provided to the user. As illustrated in FIG. 5D, the PBL 530 contains one or more known bad website addresses (i.e., URLs), as well as a name and category for each known bad website address.

In FIG. 5E, a resultant validation list (VL) 540 is illustrated which includes the user-defined good list (UDGL) as well as optionally the user-defined bad list (UDBL) and/or the predefined bad list (PBL). This validation list is employed by the logic of FIG. 4, described further below.

Continuing with the logic of FIG. 4, after intercepting a user-selected website address, the logic determines whether the intercepted website address is to be processed against known bad website addresses, INQUIRY 420. If "no", then the logic determines whether the website address is identified in the user-defined good list, INQUIRY 430. If not, no action is taken and the website page is simply displayed without alteration, STEP 450. If, however, the intercepted website address is identified in the user-defined good list, then the logic visually displays the website page and concurrently displays website fidelity via the associated user-defined visual characteristic(s) provided within the user-defined good list, STEP 440. As illustrated, processing accesses the user-defined good list via the validation list (VL) 540 of FIG. 5E. If the validation list only comprises the user-defined good list, then the validation list and user-defined good list are the same.

If, from INQUIRY 420, the logic is to process the intercepted website address against known bad website addresses, then the logic determines whether the website address is identified in the user-defined bad list or in the predefined bad list, INQUIRY 460. If the intercepted website address is in neither the user-defined bad list or the predefined bad list, then the logic proceeds to INQUIRY 430 and processes the website address as described above. However, if the intercepted website address is identified in the user-defined bad list or in the predefined bad list, then the website is displayed, and concurrent therewith, a visual indication of website trustworthiness is provided. In this case, the visual indication of website trustworthiness indicates untrustworthiness of the website page. More particularly, if the intercepted website address is within the user-defined bad list, then the user-defined visual characteristic(s) for that known bad website address are concurrently displayed along with the website page. Otherwise, if the intercepted website address is only within the predefined bad list, then a default visual characterization, for example, a red border or frame, can be employed in providing the visual indication of website trustworthiness (which in this case indicates untrustworthiness) to the user.

Note that in the above discussion, emphasis is on identifying a valid website, with only untrusted websites being secondarily identified. When a valid website is visited, the system, using techniques such as described herein, surrounds the displayed website with a colored border and user-defined text and/or user-defined graphic. The colored border immediately provides a visual identification of the nature of the site, that is, trusted or untrusted, or unaltered. The text and/or graphic are used to foil an attacker from attempting to present their own colored border. The text and graphic are (in each instance) user-defined, and thus, unavailable to the attacker.

In one implementation, the system operates as a proxy system, wherein the user registers their sensitive sites with the system. The user enters, per site, user-defined text or display, and optionally, customizes the color for the border or frame to be concurrently displayed with the website. In one example, the color green may be employed as the default color for a valid website.

Under normal operation, when a user visits a registered valid website, the user receives a visual indication of the website's trustworthiness, that is, the colored border and any user-defined text or graphics. This becomes the norm for the user. Thus, during a phishing attack, the user readily recognizes that they are not at the registered bank site, since there is no border or user-defined text or graphic. Advantageously, this approach does not rely on identifying bad website addresses (though this too, could be an optional enhancement), but rather, on identifying good website addresses. The user is required to input only enough information to customize the concurrent display of trustworthiness with display of the actual website page. The website page does not require any modification and the user is not storing their password(s) in any location remote from their terminal.

Format of the user-defined good list may be:
Site: Comment: Color
https://secure.mybank.com/login.asp: THIS IS MY BANK TEXT MESSAGE: green The border can optionally be a graphic or other image that is repeated within the border. Also, the user's text message could be displayed as a simple text message or with an image associated therewith, thereby further enhancing the difficulty of an attacker in replicating the user's customized visual indication of website trustworthiness.

As explained further below, the process of registering a website could include visual verification of the website, by displaying it within the user's browser, some research about the website address to discover if sub-domains are required (possibly modifying the URL provided by the user to include sub-domains). Also, a predefined good list (PGL) of known good websites as well as a predefined bad list (PBL) of known bad websites could be provided or accessed to make the process simpler for the user.

A predefined list of bad websites could be employed, but bad website processing is optional and based on user preference. The predefined list of bad websites would not be configurable by the user. Websites identified in the predefined bad list would be identified as phishing websites, and the list would be updated centrally using a cryptographically strong technique. A default visual characterization, such as a red border or frame may be employed when a website address on the predefined bad list is identified by the user.

When processing only good websites, bordering occurs when the site is within the user's defined good list. When processing good and bad websites, a predefined list of known phishing sites (i.e., the predefined bad list) can be employed in addition to the user-defined good list, as well as the user-defined bad list.

FIGS. 6A-6D depict one embodiment of logic for populating the user-defined good list (UDGL) and the user-defined bad list (UDBL). Referring first to the high level logic of FIG. 6A, a user initiates website registration, STEP 600, and the logic determines whether the user-identified website address is to be selected from the predefined good list, INQUIRY 610. If "yes", then the logic of FIG. 6B and the predefined good list 510 are employed by the user in selecting and adding a known good website address to the user-defined good list 500, STEP 620. If the website address is not to be selected from the predefined good list, then from INQUIRY 610, the user identifies a website address to be added to either the user-defined good list 500 or the user-defined bad list 520 using the logic of FIG. 6C, STEP 640.

Figure 6A:
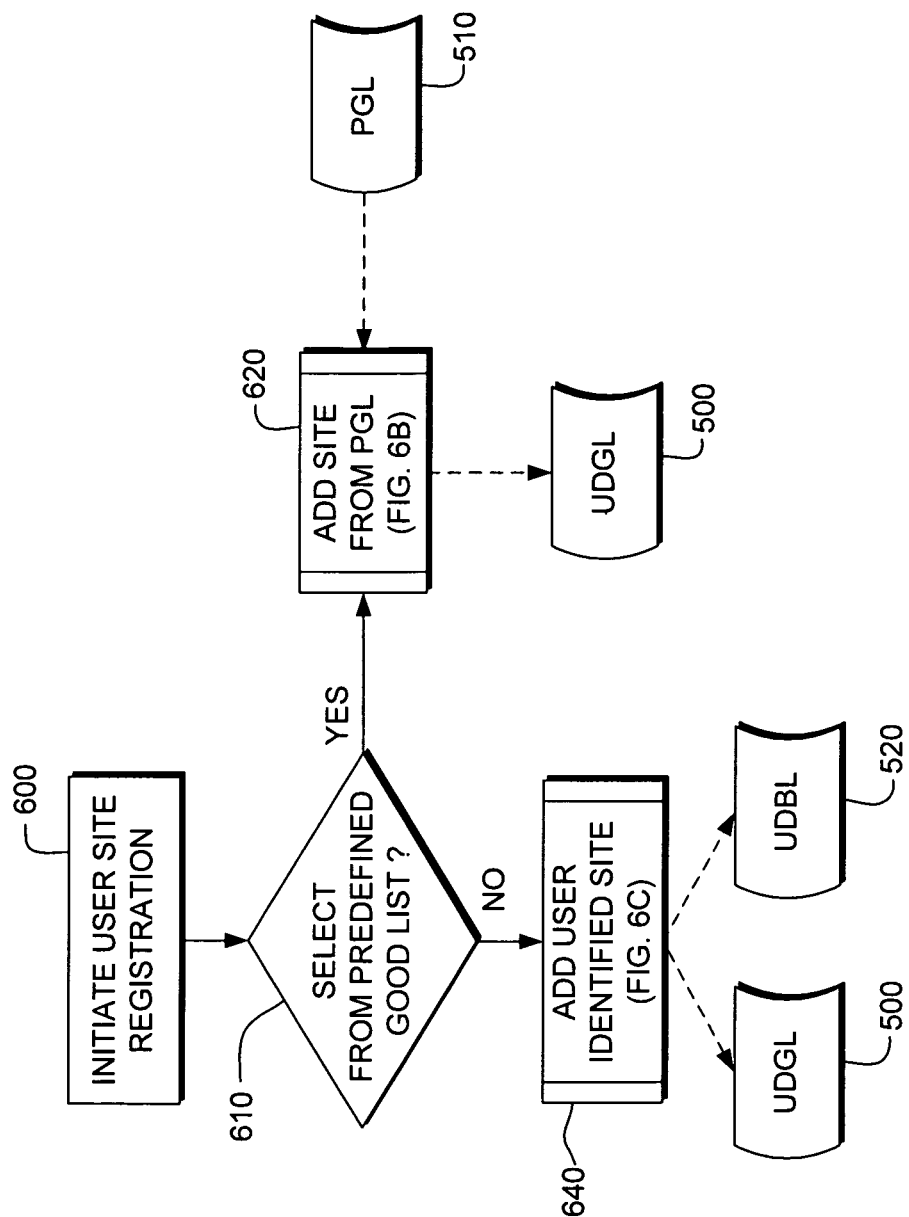
FIG. 6A depicts one embodiment of logic to populate the user-defined good list and the user-defined bad list, in accordance with an aspect of the present invention.
Figure 6B:
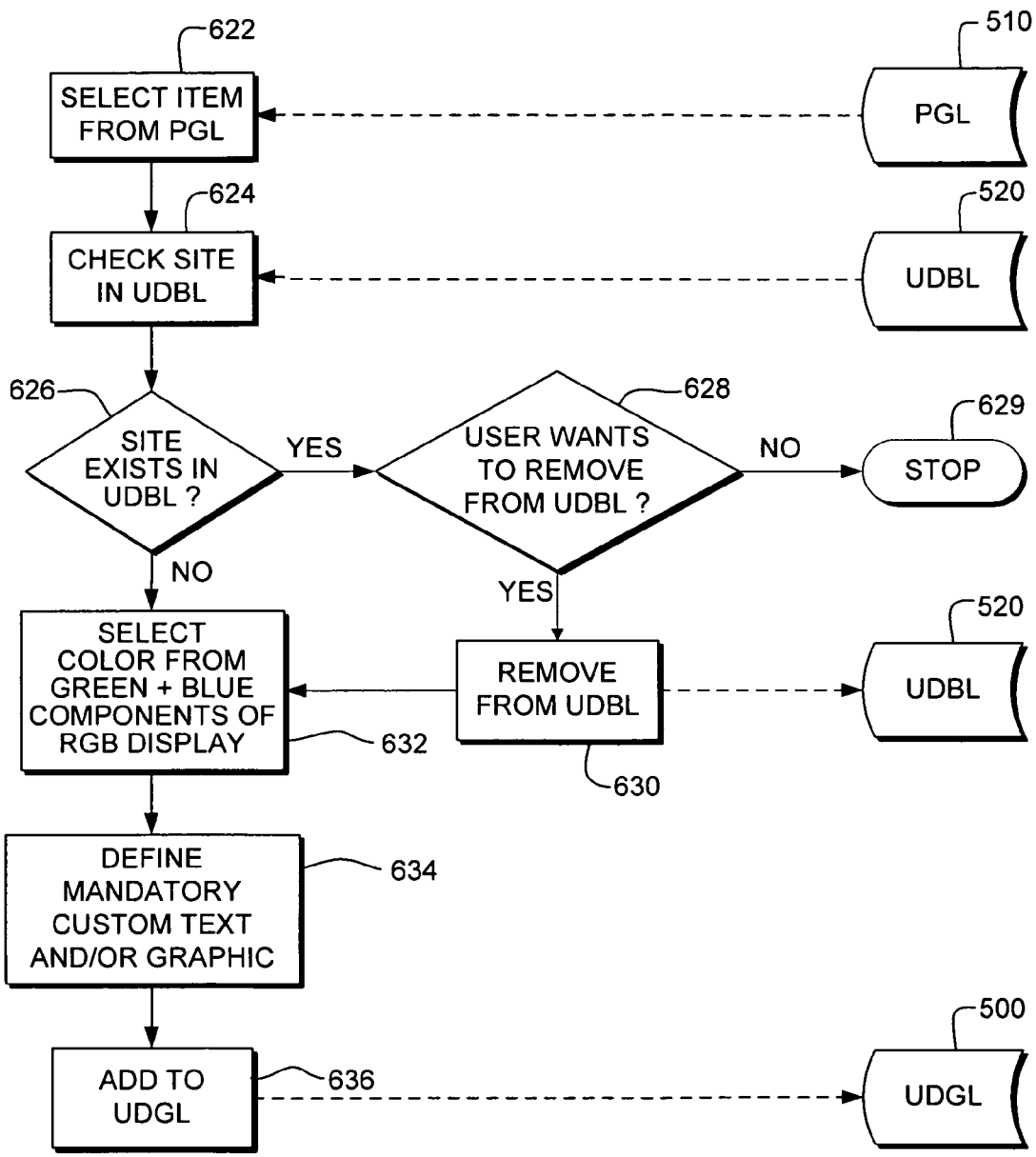
FIG. 6B depicts one embodiment of logic for adding a website address from the predefined good list to the user-defined good list, in accordance with an aspect of the present invention.

In FIG. 6B, the predefined good list (PGL) 510 is employed by the user in selecting a website address for inclusion in the user-defined good list (UDGL), STEP 622. As an initial check, the user-defined bad list (UDBL) 520 is employed by the logic in determining whether the selected website address has been previously identified by the user as a bad website address, STEP 624. Specifically, the logic determines whether the selected website address exists within the user-defined bad list, INQUIRY 626. If "yes", then the logic inquires whether the user wishes to remove the website address from the user-defined bad list, INQUIRY 628, and if "no", processing stops, STEP 629. However, if the user wishes to remove the website address from the user-defined bad list, then the user-defined bad list 520 is referenced and the listing is removed, STEP 630, before the logic prompts the user to select a color (and color component intensity) from the green and blue components of the associated red green blue (RGB) display, STEP 632. If the website address selected does not exist within the user-defined bad list, then the logic proceeds directly to STEP 632. Next, the logic requires the user to define a custom text and/or custom graphic for concurrent display with the selected website page as a customized visual indication of the website's trustworthiness, STEP 634. Once the color component and the custom text and/or custom graphic have been selected, the website address and associated one or more user-defined visual characteristics for display are added to the user-defined good list 500, STEP 636.

Figure 6C:
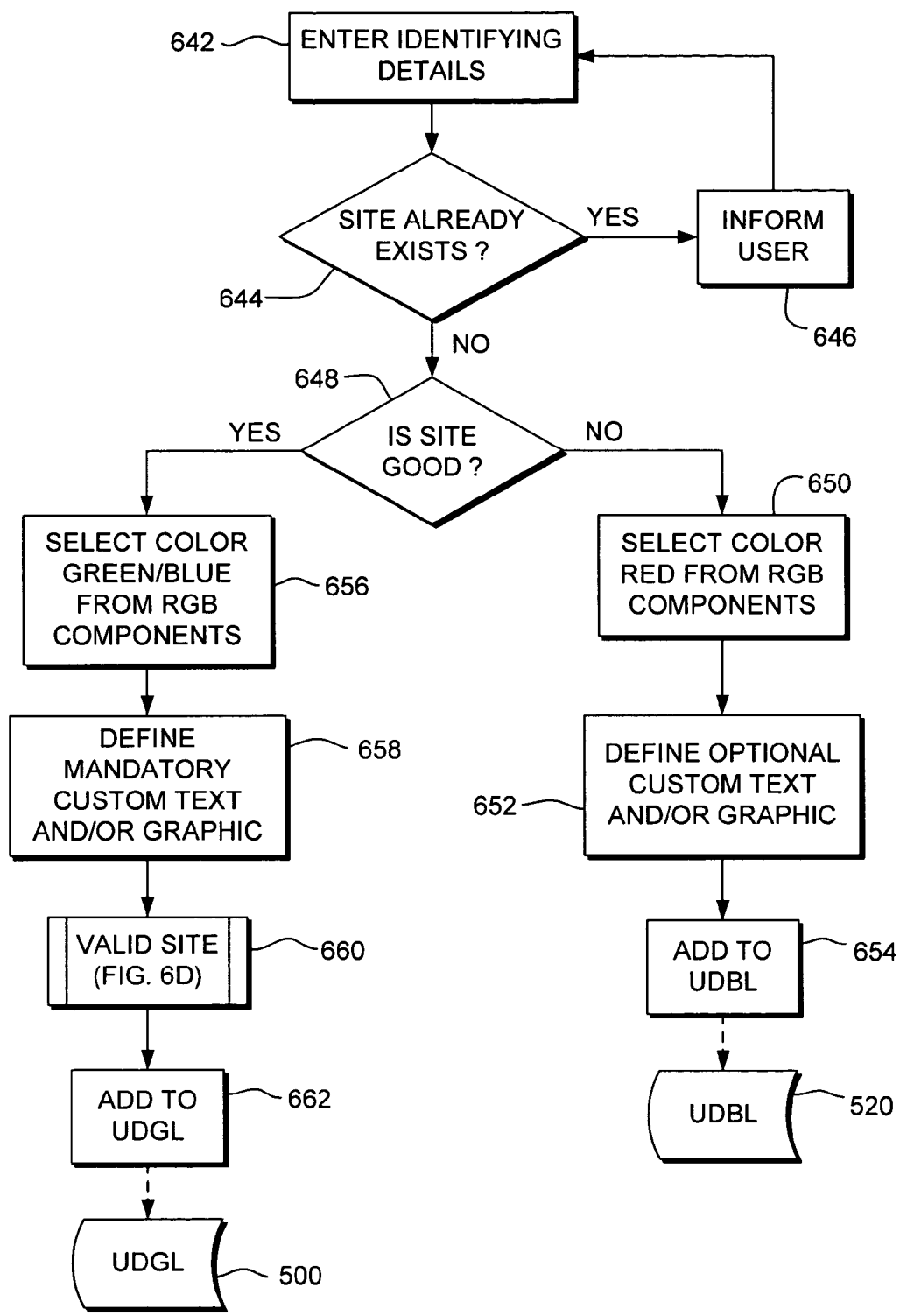
FIG. 6C depicts one embodiment of logic for adding a user-identified website address to one of the user-defined good list or the user-defined bad list being populated in FIG. 6A, in accordance with an aspect of the present invention.

Assuming that the website address is not selected by the user from the predefined good list, then the logic of FIG. 6C is employed by the user in identifying a website address to be included within either the user-defined good list or the user-defined bad list. The user begins by entering identifying details, such as the website address (i.e., URL), name of the website and category of the website, STEP 642. The logic then determines whether the website address already exists within one or more of the user-defined good list, the user-defined bad list, the predefined good list or the predefined bad list, INQUIRY 644, and if "yes", then the user is informed, STEP 646. If the website address is not already identified in, for example, the user-defined good list or the user-defined bad list, then the logic ascertains from the user whether the website address is a good website address, INQUIRY 648. If "no", then the logic selects the color red (at a defined red component pixel intensity) from the red green blue components of the display in order that when the website page is displayed, a red border or frame is also concurrently provided, STEP 650. Next, the logic optionally allows for definition of a user-defined text or user-defined graphic, STEP 652, before the website address and associated user-defined visual characteristic(s) are added to the user-defined bad list 520, STEP 654.

Figure 6D:
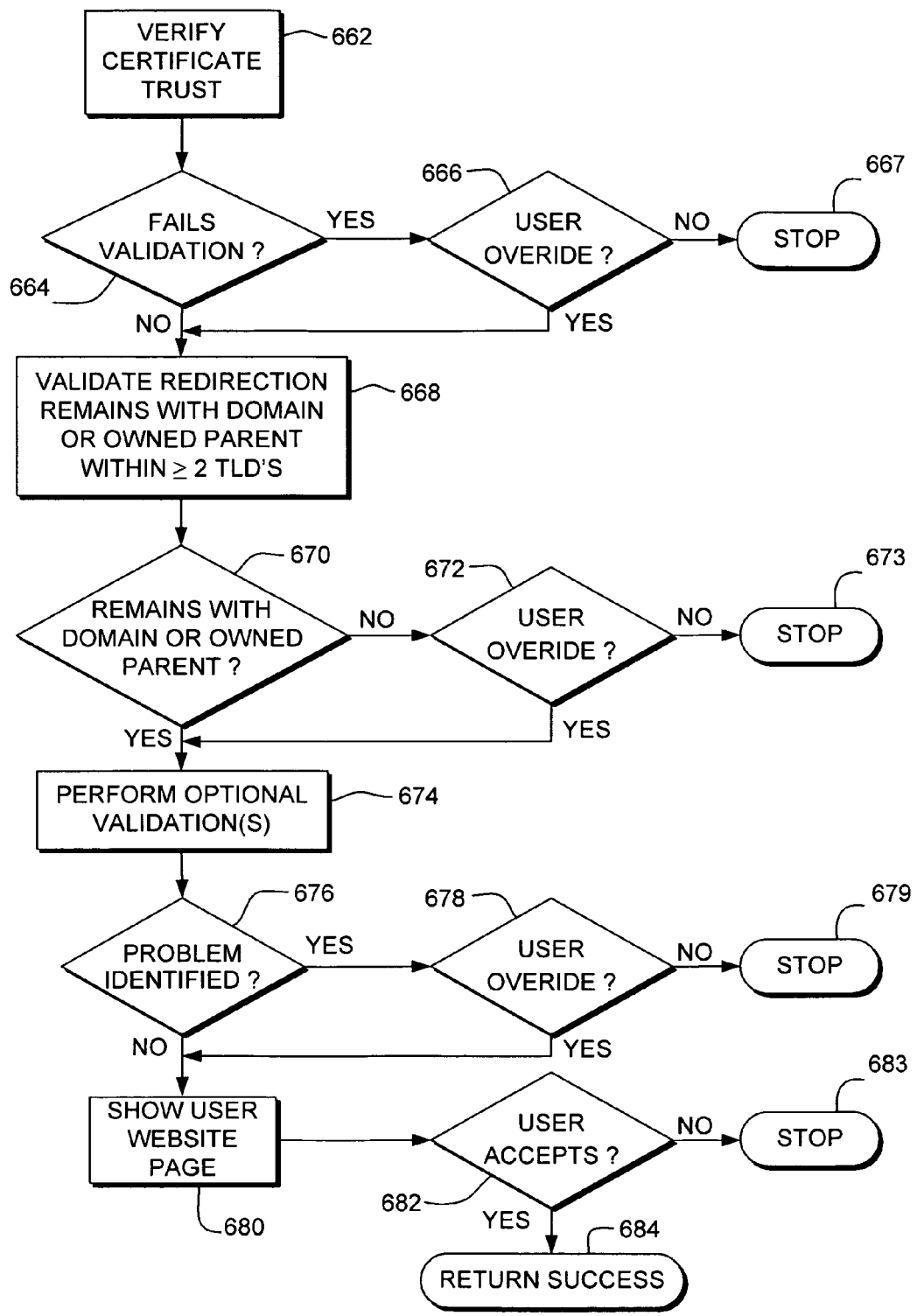
FIG. 6D depicts one embodiment of logic for validating a website address within the logic of FIG. 6C, in accordance with an aspect of the present invention.

If the website address is identified as a good website address, then from INQUIRY 648, a color is selected using the green and blue components of the red green blue display, STEP 656. As noted above, this color is subsequently employed in displaying the border or frame concurrent with display of the corresponding website page. The user then defines a mandatory user-defined text or user-defined graphic, STEP 658, and the website address is automatically validated, STEP 660. FIG. 6D illustrates one example of a validation process for a website address to be added to the user-defined good list. After validation, the website address is added to the user-defined good list 500, STEP 662.

FIG. 6D illustrates one example of logic for validating a user-identified website address being added to the user-defined good list at STEP 660 of the logic of FIG. 6C. This validation logic of FIG. 6D begins with verifying a certificate trust with the website address, STEP 662. Logic determines whether the certificate trust validation process fails, INQUIRY 664, and if "yes", inquires whether the user wishes to override failure of the certificate verification process, INQUIRY 666. If "no", then processing terminates, STEP 667. If the user wishes to override the failed certificate validation process (for example, because the user has not imported the certificate signer's certificate (trusted authority) into their browser, but knows it to be a valid certificate, such as might be the case on an Intranet accessing corporate secure web sites), then the user may chose to trust the selected website.

After completing the certificate validation process, the logic validates that any redirection of the website address remains within the address domain or a parent-owned domain, that is, remains within the parent domain level of the website address (e.g., one sub-domain after the country top level domain, i.e., within bankofamerica.com, where .com is the country top level domain, or HSBC.co.uk, where .co.uk is the country top level domain), STEP 668. If the user remains within two top domain levels of the selected website address, then an assumption is made that any redirection is valid. The logic ascertains whether the user remains within the domain or an owned parent domain, that is, within two or more top level domains, INQUIRY 670. If "no", then the logic ascertains whether the user wishes to override the requirement, INQUIRY 672, and if "no", processing terminates, STEP 673. If the user wishes to override the requirement, or if the user remains within a domain or the parent-owning domain, then the logic performs any additional optional validation, STEP 674. This optional validation process may use any one of numerous available validation approaches, such as, examining a list of known-bad websites, or employing a URL and a password hash. The logic determines whether a problem has been identified using the optional validation, INQUIRY 676, and if "yes", whether the user wishes to override the identified problem, INQUIRY 678. If "no", then processing terminates, STEP 679. If the user wishes to override the identified problem, or if no problem is identified, then the logic shows the user the website page accessed via the website address, STEP 680, and inquiries whether the user wishes to accept the website page as a valid known good website page, INQUIRY 682. If "no", then processing terminates, STEP 683, otherwise, an indication of successful validation is returned, STEP 684.

In yet a further aspect of the present invention, a technique is provided for deploying one or more aspects of the trustworthiness logic on one or more processing units. One embodiment of the deployment logic is described with reference to FIGS. 7A-7B.

Figure 7A:
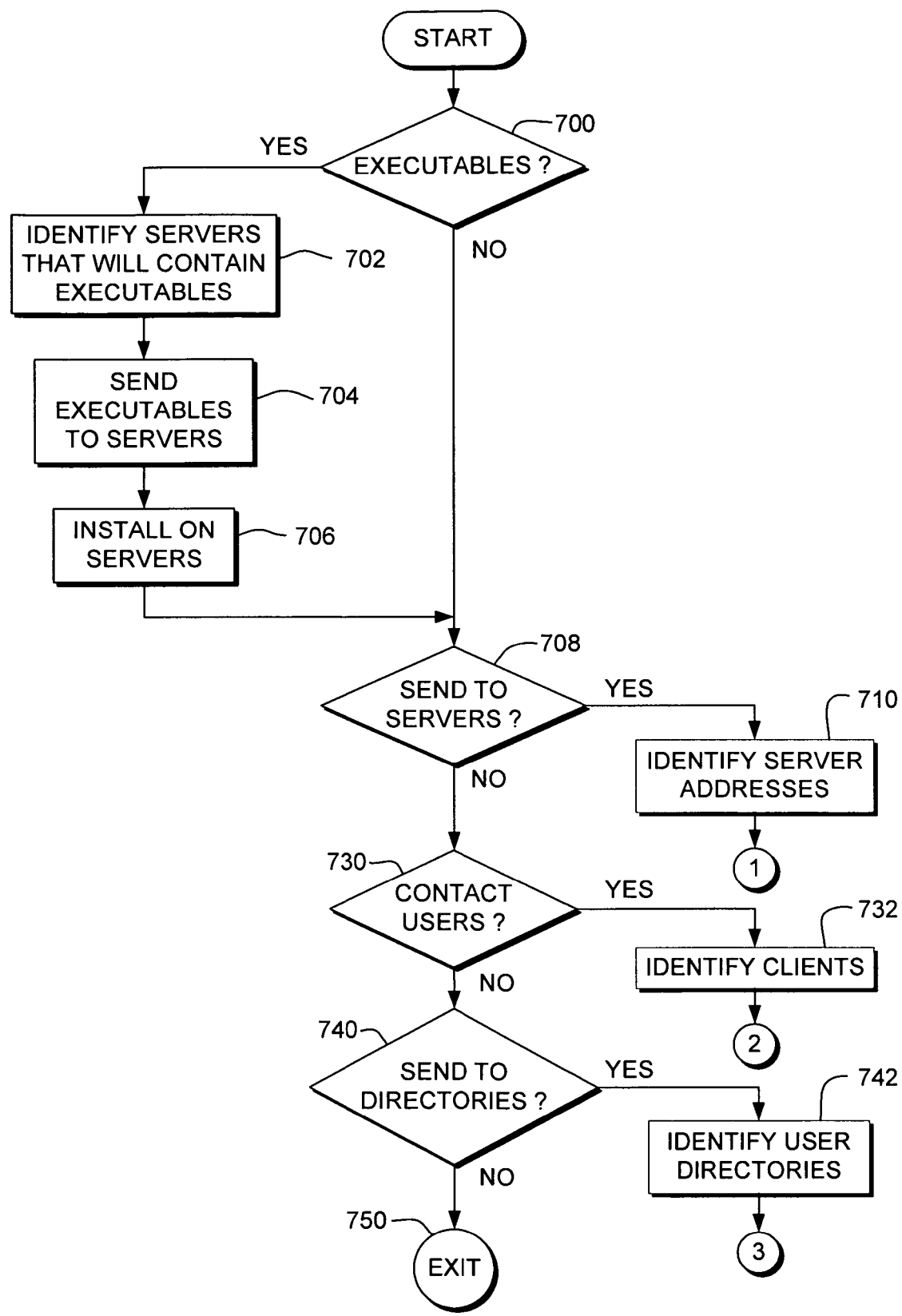
FIGS. 7A-7B depict one embodiment of logic associated with deploying website trustworthiness logic on one or more processing units, in accordance with an aspect of the present invention.

Referring to FIG. 7A, initially, a determination is made as to whether there are any programs that are to reside on one or more servers when the trustworthiness logic is executed, INQUIRY 700. If so, then the one or more servers to include the executables are identified, STEP 702, and the trustworthiness logic for the one or more servers is transferred directly to the servers' storage via, for instance, a File Transfer Protocol (FTP) or some other protocol or by copying through the use of a shared file system, STEP 704. The logic is then installed on the servers, STEP 706.

Figure 7B:
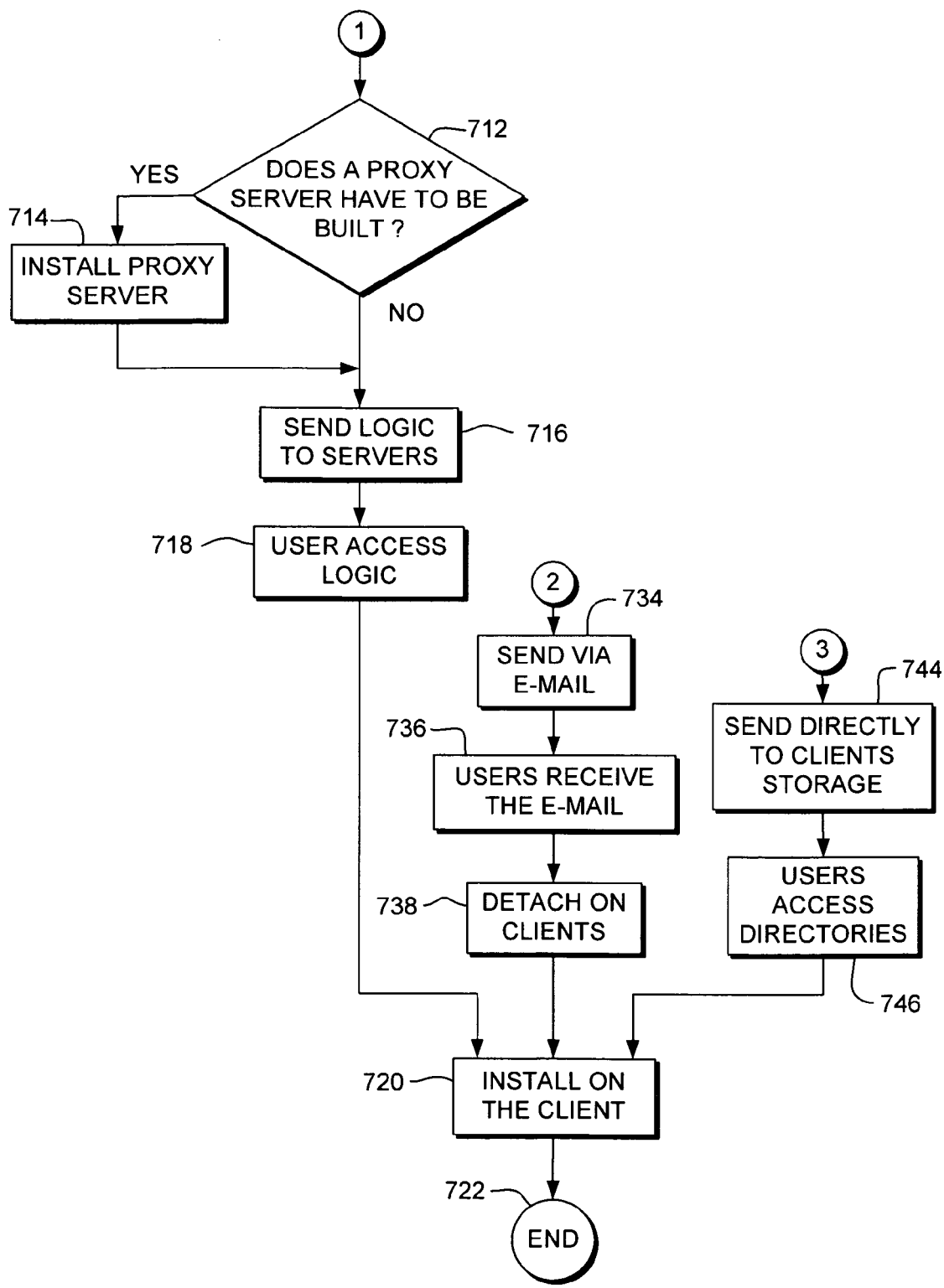

Thereafter, or if there are no executables, a further determination is made as to whether the trustworthiness logic is to be deployed by having users access the logic on a server or servers, INQUIRY 708. If the users are to access the trustworthiness logic on servers, then the server addresses that are to store the logic are identified, STEP 710. In one example, a determination is made as to whether a proxy server is to be built to store the trustworthiness logic, INQUIRY 712 (FIG. 7B). A proxy server is the server that sits between a client application, such as a web browser, and a real server. It intercepts the requests to the real server to see if it can fulfill the request itself. If not, it forwards the request to the real server. Two primary benefits of the proxy server are to improve performance and to filter requests. If a proxy server is to be built, then the proxy server is installed, STEP 714.

Thereafter, or if a proxy server is not to be built (e.g., because it already exists), the trustworthiness logic is sent to the server either via a protocol, such as file transfer protocol (FTP), or it is copied directly from the source files to the server files via file sharing, STEP 716. As another example, a transaction is sent to the one or more servers that includes the trustworthiness logic and the servers process the transaction, then receive and copy the logic to the servers' file systems.

After the trustworthiness logic is stored at the servers, the users, via their client computers, access the logic on the servers and may copy at least a portion of the logic to their client computers' file systems, STEP 718. The user then executes the program that installs the logic on the client computer, STEP 720. In a further example, the servers automatically copy one or more aspects of the trustworthiness logic to each client and then run the installation program for the logic at each client computer. This concludes one example of the deployment processing, STEP 722.

Returning to INQUIRY 708 (FIG. 7A), if the logic is not to be deployed by having users access the logic on one or more servers, then processing continues with a determination as to whether the logic is to be deployed by sending the logic to users via e-mail, INQUIRY 730. If so, the set of users where the logic is to be deployed is identified together with the addresses of the user client computers, STEP 732. The trustworthiness logic is sent via e-mail to each of the user's client computers, STEP 734 (FIG. 7B). The users receive the e-mail, STEP 736, and detach the trustworthiness logic from the e-mail to a directory on their client computers, STEP 738. The user executes the program that installs the logic on the client computer, STEP 720, and exits the process, STEP 722.

Returning to INQUIRY 730 (FIG. 7A), if the trustworthiness logic is not to be deployed via e-mail, then a further determination is made as to whether the logic is to be sent directly to user directories on their client computers, STEP 740. If so, the user directories are identified, STEP 742. The trustworthiness logic is directly transferred to the user's client computer directory, STEP 744 (FIG. 7B). This can be done in several ways, such as, but not limited to, sharing of the file system directories and then copying from the sender's file system to the recipient user's file system, or alternatively, using a transfer protocol, such as file transfer protocol (FTP). The users access the directories on their client file systems in preparation for installing the trustworthiness logic, STEP 746. The user executes the program that installs the logic on the client computer, STEP 720, and exits the deployment process, STEP 722.

Returning to INQUIRY 740 (FIG. 7A), if the logic is not to be sent directly to the users' directories, then processing ends, STEP 750.

Those skilled in the art will note from the above discussion that provided herein is a novel approach for displaying website trustworthiness to user. The approach includes establishing a user-defined good list identifying at least one known good website address, wherein each known good website address in the user-defined list has associated therewith at least one user-defined visual characteristic for display. Responsive to the user selecting to visit a website address identified in the user-defined good list, then the website is displayed for the user, as well as the associated user-defined visual characteristic from the user-defined good list. The user-defined visual characteristic thus provides a customized visual indication of website trustworthiness to the user. Although described herein as being displayed by the user's browser, the requested website could alternatively be displayed employing a separate program. As explained above, each user-defined visual characteristic associated with a known good website address includes a user-defined text, a user-defined graphic and/or a user-selected border color for concurrent display with display of the website addressed by the website address in the user-defined good list. In the discussion above, the user-selected border color is described as a portion of the display. Alternatively, an unbordered region of zero pixels could be employed such that the border essentially comprises the complete visual display, with the border overlying display of the addressed website.

Further, for a network proxy implementation such as described above, a separate processing unit could be identified that does not perform the proxying, only the trustworthiness validation. In this implementation, a proxy would receive the initial request to access a website address, and forward the request on to the separate validation processing unit using a defined protocol, such as ICAP (Internet Content Adaptation Protocol), where the request is addressed by the logic. This approach would be similar to the network proxy case, only it is not limited to running the validation process on the same device as the network proxy device. Further, in the case of a network proxy, the network proxy (or device processing content on behalf of the proxy, such as an ICAP-capable server), will have the UDGL, PBL and UDBL. That is, the user (in this implementation) will again need to configure their own UDGL and UDBL, etc.

Although an embodiment of deploying logic is provided, many variations can be made without departing from the spirit of the present invention.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention, as described above. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
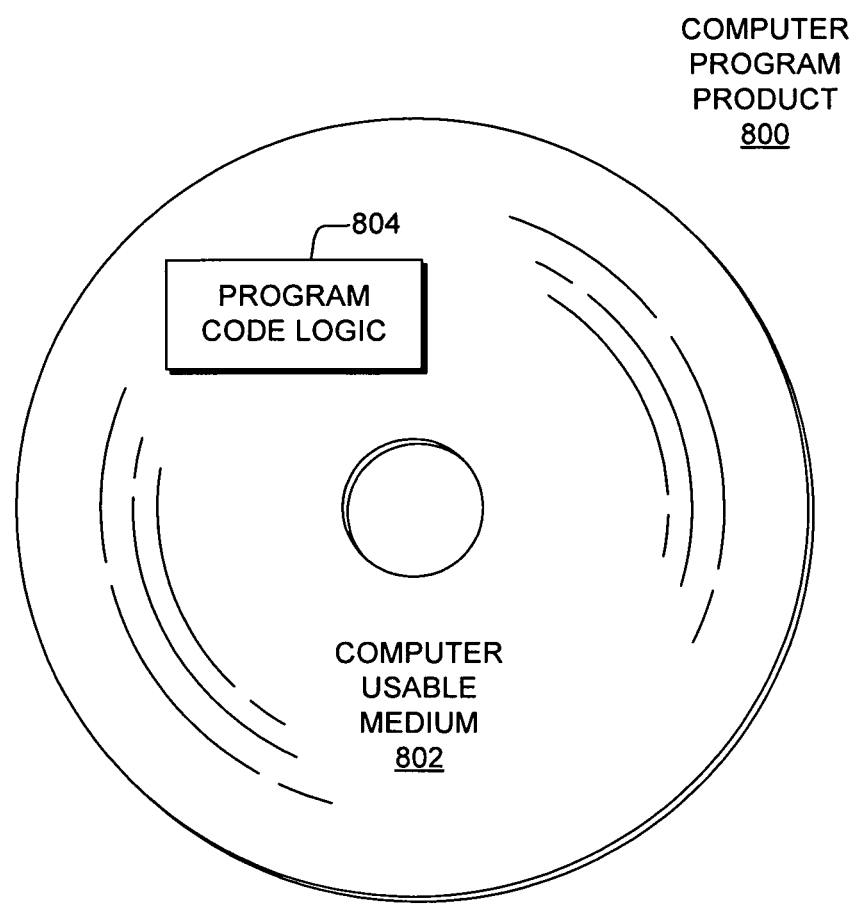
FIG. 8 depicts one embodiment of a computer program product incorporating one or more aspects of the present invention.

One example of an article of manufacture or a computer program product incorporating one or more aspects of the present invention is described with reference to FIG. 8. A computer program product 800 includes, for instance, one or more computer usable media 802 to store computer readable program code means or logic 804 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples. Different types of nodes or the number of nodes being provisioned can be different than described herein. Further, other types of computing environments can benefit from one or more aspects of the present invention.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

As used herein, the term obtaining, such as in obtaining a request, includes, but is not limited to, receiving, being provided, retrieving, determining, accessing, etc.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of displaying website trustworthiness to a user, the method comprising:
   establishing, by the user, a user-defined good list for the user, the user-defined good list identifying at least one user known good website address;
   defining by the user at least one user-defined, custom visual characteristic for customizing a display of a known good website address by a user known good website address of the at least one user known wind website address in the user-defined good list;

associating the at least one user-defined, custom visual characteristic with the user known good website address in the user-defined good list; and responsive to the user selecting to visit, via a processor, the known good website addressed by the user known good website address identified in the user-defined good list, displaying by the processor the known good website for the user and concurrently customizing the display of the known good website by displaying the at least one user-defined, custom visual characteristic associated with the user known good website address identified in the user-defined good list, wherein the at least one user-defined, custom visual characteristic provides a user-defined, customized visual indication of website trustworthiness to the user.

2. The method of claim 1, wherein the defining comprises defining at least two of (i) a user-defined, custom text, (ii) a user-defined, custom graphic or (iii) a user-selected, custom border color for concurrent display with display of the known good website addressed by the user known good website address in the user defined good list.

3. The method of claim 1, further comprising automatically intercepting a user-selected website address and, responsive thereto, determining whether the user-selected website address is identified in the user-defined good list as a user known good website address, and if so, performing displaying a website addressed by the user-selected website address and concurrently customizing the display of the website by displaying at least one user-defined, custom visual characteristic associated with the website, otherwise performing only the displaying of the website for the user.

4. The method of claim 1, wherein the establishing further comprises obtaining at least one of a predefined bad list of website addresses or a user-defined bad list of at least one user-known bad website address, each website address in the predefined bad list of website addresses having associated therewith a default visual characteristic for display when a website addressed by that website address in the predefined bad list is selected by the user for display, and each user-known bad website address in the user-defined bad list having associated therewith a user-defined visual characteristic for concurrent display when a website addressed by that website address in the user-defined bad list is selected by the user for display.

5. The method of claim 4, further comprising automatically intercepting a user-selected website address and determining whether the user-selected website address is a known had website address by comparing the user-selected website address against one or more website addresses in at least one of the predefined bad list of website addresses or the user-defined bad list, and if identified within either list, displaying a website addressed by the user-selected website address for the user and concurrently displaying the default visual characteristic associated therewith from the predefined bad list or the user-defined visual characteristic associated therewith from the user-defined bad list, depending on the list within which the user-selected website address is identified.

6. The method of claim 1, wherein the defining comprises defining by the user at least one user-defined, custom color, and (i) at least one user-defined, custom text or (ii) at least one user-defined, custom graphic for displaying with each website addressed by a user known good website address in the user-defined good list.

7. The method of claim 1, further comprising:
determining whether a website address selected from a predefined good list of website addresses is in a user-defined bad list of at least one user-known bad website address, and if so, determining whether the selected website address should be removed from the user-defined bad list, and if removed from the user-defined bad list, then proceeding to associate the at least one user-defined, custom visual characteristic with the selected website address in the user-defined good list, wherein the associating comprises selecting a color from a red green blue (RGB) display for use in a border region of the display when a website addressed by that selected website address is displayed, and defining at least one of a user-defined text or a user-defined graphic for display within the border region of the display when the website addressed by that selected website address is displayed.

8. The method of claim 1, wherein the establishing comprises entering a user-identified website address, and indicating whether the user-identified website address is a good website address, and, if indicated as a good website address, the defining comprises selecting a color from the green and blue components of a red green blue (RGB) display for use in a border region of the display with display of a website addressed by that user-identified website address, and defining at least one user-defined, custom text or at least one user-defined, custom graphic for inclusion in the border region to customize by the user the visual indication of website trustworthiness to the user, and automatically validating the user-identified website address as a good website address, and once validated, adding the user-identified website address to the user-defined good list as a user known good website address.

9. The method of claim 8, wherein if the user-identified website is indicated as a bad website address, then associating the color red from the red green blue (RGB) display for use in the border region of the display when the website addressed by that user-identified website address is displayed, and adding the user-identified website address to a user-defined bad list identifying user-known bad website addresses.

10. The method of claim 8, wherein automatically validating the user-identified website address comprises verifying a certificate trust with the user-identified website address, and validating that redirection from the user-identified website address remains within the domain or within a parent-owning domain within two or more top level domains of the user-identified website address, and displaying the website for user acceptance of the user-identified website address as a known-good website address prior to adding the user-identified website address to the user-defined good list.

11. A method of deploying website trustworthiness logic on one or more processing units, the method comprising:
installing website trustworthiness logic on at least one processing unit, the website trustworthiness logic facilitating:
establishing, by a user, a user-defined good list for the user, the user-defined good list identifying at least one user known good website address;
defining by the user at least one user-defined, custom visual characteristic for customizing a display of a known good website addressed by a user known good website address of the at least one user known good website address in the user-defined good list;
associating the at least one user-defined, custom visual characteristic with the user known good website address in the user-defined good list; and
responsive to the user selecting to visit the known good website addressed by the user known good website address identified in the user-defined good list, displaying the known good website for the user and concurrently customizing the display of the known good website by displaying the at least one user-defined, custom visual characteristic associated with the user known good website address identified in the user-defined good list, wherein the at least one user-defined, custom visual characteristic provides a user-defined, customized visual indication of website trustworthiness to the user.

12. A system for displaying website trustworthiness to a user, the system comprising:
a display;
at least one processing unit coupled to the display, the at least one processing unit to:
facilitate establishing, by the user, a user-defined good list for the user, the user-defined good list identifying at least one user known good website address;
facilitate defining by the user at least one user-defined, custom visual characteristic for customizing a display of a known good website addressed by a user known good website of the at least one user known good website address in the user-defined good list;
associate the at least one user-defined, custom visual characteristic with the user known good website address in the user-defined good list; and
responsive to the user selecting to visit the known good website addressed by the user known good website address identified in the user-defined good list, display the known good website for the user and concurrently customize the display of the known good website by displaying the at least one user-defined, custom visual characteristic associated with the user known good website address identified in the user-defined good list, wherein the at least one user-defined, custom visual characteristic provides a user-defined, customized visual indication of website trustworthiness to the user.

13. The system of claim 12, wherein the defining comprises defining at least two of (i) a user-defined, custom text, (ii) a user-defined, custom graphic or (iii) a user-selected, custom border color for concurrent display with display of the known good website addressed by the user known good website address in the user-defined good list.

14. The system of claim 12, wherein the at least one processing unit intercepts a user-selected website address and, responsive thereto, determines whether the user-selected website address is identified in the user-defined good list as a user known good website address, and if so, performs displaying a website addressed by the user-selected website address and concurrently customizing the display of the website by displaying a least one user-defined, custom visual characteristic associated with the website, otherwise performs only the displaying of the website for the user.

15. The system of claim 12, wherein the establishing comprises selecting a website address from a predefined good list of website addresses and the associating associates, with the selected website address, at least two user-defined, custom visual characteristics for concurrent display with display of a website addressed by the selected website address, wherein the at least two user-defined, custom visual characteristics associated with the selected website address comprises at least two of (i) a user-defined, custom text, (ii) a user-defined, custom graphic or (iii) a user-selected, custom border color for concurrent display with display of the website addressed by the selected website address, and saving the selected website address in the user-defined good list along with the associated at least two user-defined, custom visual characteristics.

16. The system of claim 12, wherein the establishing comprises entering a user-identified good website address and the defining comprises selecting a color from a red green blue (RGB) display for use in a border region of the display with display of a website addressed by that user-identified good website address, and defining at least one user-defined, custom text or at least one user-defined, custom graphic for inclusion in the border region to customize by the user the visual indication of website trustworthiness to the user, and automatically validating the user-identified good website address as a good website address, and once validated, adding the user-identified good website address to the user-defined good list as a user known good website address.

17. The system of claim 16, wherein automatically validating the user-identified good website address comprises verifying a certificate trust with the user-identified good website address, and validating that redirection from the user-identified good website address remains within the domain or within a parent-owning domain within two or more top level domains of the user-identified good website address, and displaying the website for user acceptance of the user-identified good website address as a known-good website address prior to adding the user-identified good website address to the user-defined good list.

18. An article of manufacture comprising:
at least one non-transitory, computer-readable medium having computer-readable program code logic to facilitate displaying website trustworthiness to a user, the computer-readable program code logic when executing on at least one processing unit facilitating performing the following:
establishing, by a user, a user-defined good list for the user, the user-defined good list identifying at least one user known good website address;
defining by the user at least one user-defined, custom visual characteristic for customizing a display of a known good website addressed by a user known good website of the at least one user known good web site address in the user-defined good list;
associating the at least one user-defined, custom visual characteristic with the user known good website address in the user-defined good list; and
responsive to the user selecting to visit the known website addressed by the user known good website address identified in the user-defined good list, displaying the known good website for the user and concurrently customizing the display of the known good website by displaying the at least one user-defined, custom visual characteristic associated with the user known good website address identified in the user-defined good list, wherein the at least one user-defined, custom visual characteristic provides a user-defined, customized visual indication of website trustworthiness to the user.

19. The article of manufacture of claim 18, wherein the defining comprises defining at least two of (i) a user-defined, custom text, (ii) a user-defined, custom graphic or (iii) a user-selected, custom border color for concurrent display with display of the known good website addressed by the user known good website address in the user-defined good list.

20. The article of manufacture of claim 18, wherein the computer-readable program code logic when executing on the at least one processing unit further comprises logic to perform automatically intercepting of a user-selected website address and, responsive thereto, to determine whether the user-selected website address is identified in the user-defined good list as a user known good website address, and if so, performing displaying a website addressed by the user-selected website address and concurrently customizing the display of the website by displaying at least one user-defined, custom visual characteristic associated with the website, otherwise performing only the displaying of the website for the user.

* * * * *